United States Patent
Gota et al.

(10) Patent No.: US 9,752,055 B2
(45) Date of Patent: Sep. 5, 2017

(54) VISCOSITY MODIFIER, AND EMULSION RESIN COMPOSITION OR AQUEOUS COATING COMPOSITION EACH CONTAINING SAME

(71) Applicant: ADEKA CORPORATION, Tokyo (JP)

(72) Inventors: Tetsuya Gota, Tokyo (JP); Takashi Ono, Tokyo (JP)

(73) Assignee: ADEKA CORPORATION, Tokyo (JP)

(*) Notice: Subject to any disclaimer, the term of this patent is extended or adjusted under 35 U.S.C. 154(b) by 0 days.

(21) Appl. No.: 14/896,951

(22) PCT Filed: Jun. 14, 2013

(86) PCT No.: PCT/JP2013/066519
§ 371 (c)(1),
(2) Date: Dec. 9, 2015

(87) PCT Pub. No.: WO2014/199522
PCT Pub. Date: Dec. 18, 2014

(65) Prior Publication Data
US 2016/0130470 A1    May 12, 2016

(51) Int. Cl.
*C08G 18/00* (2006.01)
*C09D 175/08* (2006.01)
(Continued)

(52) U.S. Cl.
CPC ......... *C09D 175/08* (2013.01); *C08G 18/283* (2013.01); *C08G 18/3206* (2013.01);
(Continued)

(58) Field of Classification Search
CPC .............. C08G 18/735; C08G 18/758; C08G 18/7614; C08G 18/757; C08G 18/3206; C08G 18/283; C09D 175/08
See application file for complete search history.

(56) References Cited

U.S. PATENT DOCUMENTS

| 5,753,731 A | 5/1998 | Yoshioka et al. |
| 6,440,431 B1 | 8/2002 | Yoshida et al. |

FOREIGN PATENT DOCUMENTS

| EP | 0 761 780 | 3/1997 |
| JP | 54-80349 | 6/1979 |

(Continued)

OTHER PUBLICATIONS

Document N_English Translation.*
International Search Report dated Sep. 17, 2013 in International Application No. PCT/JP2013/066159.

*Primary Examiner* — Michael L Leonard
(74) *Attorney, Agent, or Firm* — Wenderoth, Lind & Ponack, L.L.P.

(57) ABSTRACT

The present invention relates to a viscosity modifier represented by the following general formula (1), and an emulsion composition or an aqueous paint composition including the viscosity modifier:

(1)

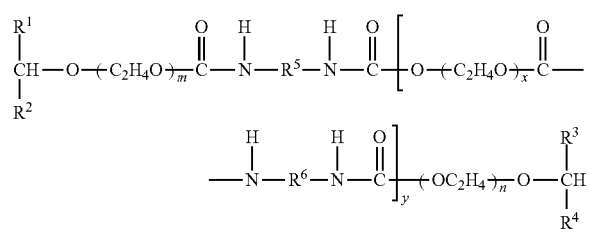

where: $R^1$ to $R^4$ each represent a linear alkyl group having 1 to 13 carbon atoms; $R^5$ and $R^6$ each represent a group represented by the following formula (2) or (3); m and n (Continued)

each represent a number from 3 to 15; x represents a number from 40 to 800; and y represents a number equal to or more than 1, provided that each of a total number of carbon atoms in $R^1$ and $R^2$ and a total number of carbon atoms in $R^3$ and $R^4$ needs to be from 10 to 14.

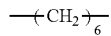

(2)

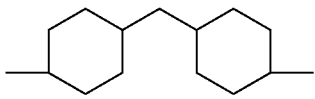

(3)

18 Claims, 2 Drawing Sheets

(51) Int. Cl.
| | |
|---|---|
| *C09D 5/02* | (2006.01) |
| *C09D 7/12* | (2006.01) |
| *C09D 201/00* | (2006.01) |
| *C08G 18/32* | (2006.01) |
| *C08G 18/73* | (2006.01) |
| *C08G 18/75* | (2006.01) |
| *C08G 18/76* | (2006.01) |
| *C08G 18/48* | (2006.01) |
| *C09D 7/00* | (2006.01) |
| *C08G 18/28* | (2006.01) |

(52) U.S. Cl.
CPC ......... *C08G 18/4833* (2013.01); *C08G 18/73* (2013.01); *C08G 18/735* (2013.01); *C08G 18/757* (2013.01); *C08G 18/758* (2013.01); *C08G 18/7614* (2013.01); *C09D 5/02* (2013.01); *C09D 7/002* (2013.01); *C09D 7/12* (2013.01); *C09D 201/00* (2013.01)

(56) References Cited

FOREIGN PATENT DOCUMENTS

| | | |
|---|---|---|
| JP | 9-71766 | 3/1997 |
| JP | 11-199854 | 7/1999 |
| JP | 2000-239120 | 9/2000 |
| JP | 2000-239649 | 9/2000 |
| JP | 2000-303056 | 10/2000 |
| JP | 2002-69430 | 3/2002 |
| JP | 2009-280656 | 12/2009 |
| JP | 2009280656 A | * 12/2009 |

* cited by examiner

VISCOSITY MODIFIER, AND EMULSION RESIN COMPOSITION OR AQUEOUS COATING COMPOSITION EACH CONTAINING SAME

TECHNICAL FIELD

The present invention relates to a viscosity modifier which is blended into an emulsion resin or an aqueous paint to provide an emulsion resin composition or an aqueous paint composition having satisfactory long-term storage stability at low or high temperatures.

BACKGROUND ART

In general, aqueous paints, adhesives, or pressure-sensitive adhesives are produced by using aqueous resins such as emulsion resins. When the resins are used for such applications, the resins are required to have an adequate degree of viscosity, and hence it is essential to use a viscosity modifier. As the viscosity modifier, there are known natural viscosity modifiers such as carboxymethylcellulose or hydroxyethylcellulose, alkali thickening-type viscosity modifiers, which are thickened with an alkali, such as polyacrylic acids or polyacrylic acid-containing copolymers, and urethane-type viscosity modifiers such as urethane-modified polyethers (see, for example, Patent Literatures 1 to 4).

In general, if a natural viscosity modifier or alkali thickening-type viscosity modifier out of those viscosity modifiers is added to an aqueous paint or the like, the paint has thixotropic viscosity and not leveling viscosity, and may have poor water resistance. On the other hand, a urethane-type viscosity modifier can provide a wide range of viscosities including thixotropic viscosity and leveling viscosity, and the paint has high water resistance. Because of these reasons, urethane-type viscosity modifiers are widely used for various applications or in various regions.

Many emulsion resins and paints each containing a viscosity modifier are transported, stored, and sold in cans or containers made of resins or the like. In many cases, the period between production of the paints or the like and actual use thereof may be long, and the paints or the like may often be exposed to high or low temperatures for long periods of time during transportation, storage, or the like. Specific examples thereof include storage in midsummer or in a very cold land and marine transportation right on the equator or in a very cold land. When an emulsion resin-based paint or the like containing the urethane-type viscosity modifier is exposed to a high-temperature or low-temperature state for a long period of time, there arises a problem where the product viscosity of the paint increases. This increase in product viscosity may inhibit fundamental properties of the paint to cause failures in painting or troubles in a coating to be obtained.

CITATION LIST

Patent Literature

[PTL 1] JP 10-036720 A
[PTL 2] JP 11-199854 A
[PTL 3] JP 2001-295195 A
[PTL 4] JP 2007-197520 A

SUMMARY OF INVENTION

Technical Problem to be Solved by the Invention

If products are prepared by using natural viscosity modifiers or alkali thickening-type viscosity modifiers without using urethane-type viscosity modifiers, it is hard for increases in product viscosity to occur even if they are stored at high or low temperatures for a long period of time. However, at present, the urethane-type viscosity modifiers are used as essential additives for producing paints having various properties. Therefore, an object to be achieved by the present invention is to provide an emulsion resin composition containing a urethane-type viscosity modifier which does not cause an increase in product viscosity of an emulsion resin composition even if the emulsion resin composition is stored at high or low temperatures for a long period of time.

Solution to Problem

Accordingly, the inventors of the present invention keenly investigated and found a urethane-type viscosity modifier which does not cause an increase in product viscosity even if the product is stored at high or low temperatures for a long period of time to complete the present invention. That is, according to one embodiment of the present invention, there is provided a viscosity modifier represented by the following general formula (1).

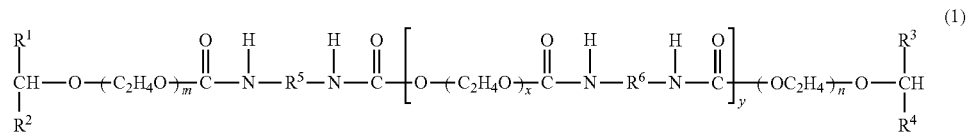

(Where $R^1$ to $R^4$ each represent a linear alkyl group having 1 to 13 carbon atoms, $R^5$ and $R^6$ each represent a group represented by the following formula (2) or (3), m and n each represent a number from 3 to 15, x represents a number from 40 to 800; and y represents a number equal to or more than 1, provided that each of a total number of carbon atoms in $R^1$ and $R^2$ and a total number of carbon atoms in $R^3$ and $R^4$ needs to be from 10 to 14.)

(2)

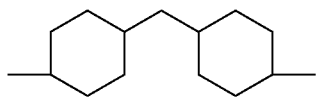
(3)

According to another embodiment of the present invention, there is provided a viscosity modifier, which is produced by subjecting secondary alcohol ethoxylates obtained by adding ethylene oxide to alcohols represented by the following general formulae (4) and (5) to a reaction with a compound represented by the following general formula (6) and then a reaction with diisocyanates represented by the following general formulae (7) and (8).

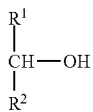
(4)

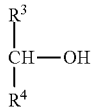
(5)

(6)

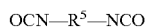
(7)

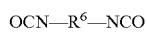
(8)

(Where $R^1$ to $R^4$ each represent a linear alkyl group having 1 to 13 carbon atoms; $R^5$ and $R^6$ each represent a group represented by the following formula (2) or (3); and x represents a number from 40 to 800, provided that each of a total number of carbon atoms in $R^1$ and $R^2$ and a total number of carbon atoms in $R^3$ and $R^4$ needs to be from 10 to 14.)

(2)

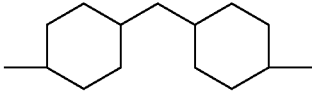
(3)

Advantageous Effects of Invention

An effect of the present invention is to provide: a urethane-type viscosity modifier which does not cause an increase in product viscosity of an emulsion resin composition containing the urethane-type viscosity modifier even if the emulsion resin composition is stored at high or low temperatures for a long period of time; and the emulsion resin composition containing same.

DESCRIPTION OF EMBODIMENTS

Figure 1:
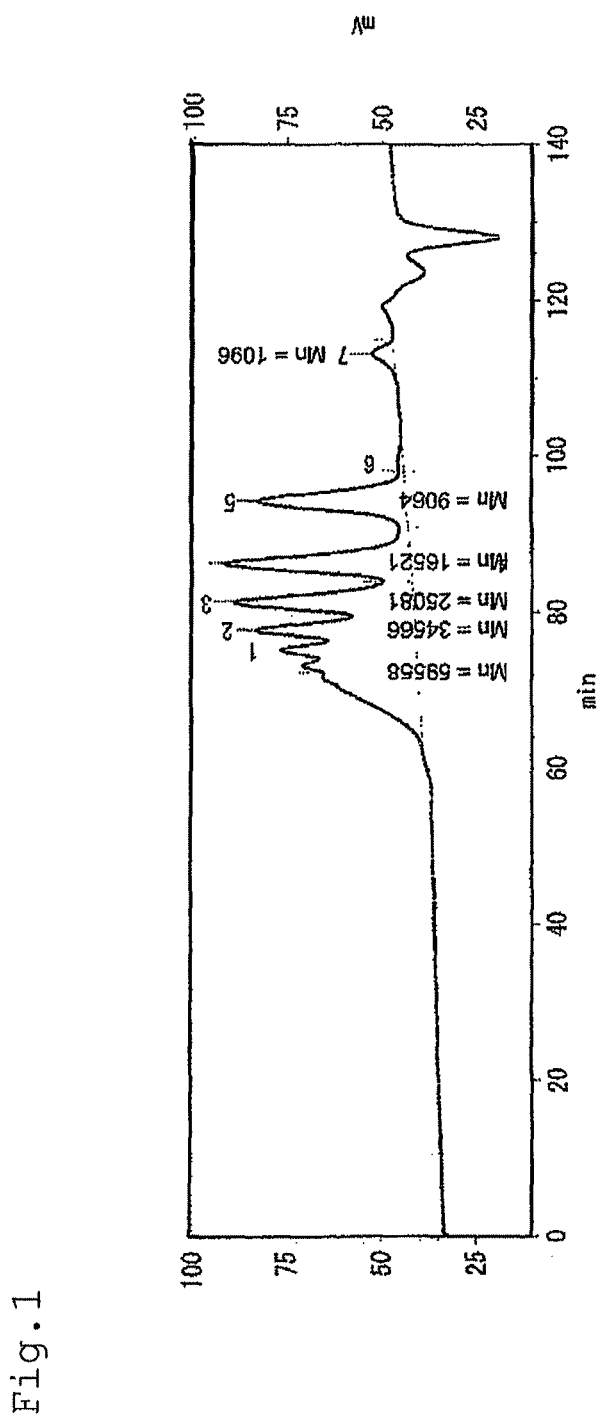
FIG. 1 is a chart of gel permeation chromatography (GPC) of Product 3 of the present invention to be described below.

The viscosity modifier of the present invention is a compound having a structure represented by the following general formula (1).

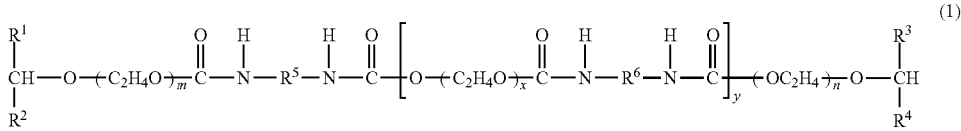
(1)

Where $R^1$ to $R^4$ each represent a linear alkyl group having 1 to 13 carbon atoms; $R^5$ and $R^6$ each represent a group represented by the following formula (2) or (3); m and n each represent a number from 3 to 15; x represents a number from 40 to 800; and y represents a number equal to or more than 1, provided that each of the total number of carbon atoms in $R^1$ and $R^2$ and the total number of carbon atoms in $R^3$ and $R^4$ needs to be from 10 to 14.)

(2)

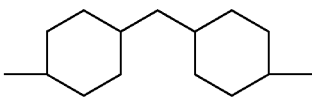
(3)

$R^1$ to $R^4$ in general formula (1) each represent a linear alkyl group having 1 to 13 carbon atoms. Examples of such alkyl group include a methyl group, an ethyl group, a propyl group, a butyl group, a pentyl group, a hexyl group, a heptyl group, an octyl group, a nonyl group, a decyl group, an undecyl group, a dodecyl group, and a tridecyl group. It should be noted that the total number of constituent carbon atoms of $R^1$ and constituent carbon atoms of $R^2$ needs to be from 10 to 14 and is more preferably from 11 to 13. As for $R^3$ and $R^4$ as well, the total number of constituent carbon atoms of $R^3$ and constituent carbon atoms of $R^4$ needs to be from 10 to 14 and is more preferably from 11 to 13.

$R^5$ and $R^6$ each represent a hexamethylene group represented by formula (2) or a group represented by formula (3). $R^5$ and $R^6$ may be identical to or different from each other, and all of the groups are preferably identical from the viewpoint of the production method.

Values for m and n are each a number from 3 to 15, preferably a number from 5 to 12 because of satisfactory stability at high or low temperatures. If the value for m or n is less than 3 or more than 15, stability at high and low temperatures deteriorates. It should be noted that the values for m and n are preferably the same from the viewpoint of the production method.

The value for x is a number from 40 to 800, preferably a number from 100 to 500 because of satisfactory stability at high and low temperatures. If the value is less than 40, solubility in paint or the like may deteriorate to form insoluble matter, while if the value exceeds 800, the product viscosity may increase to deteriorate solubility in paint or the like. It should be noted that the value for x corresponds to an average polymerization degree of polyethylene glycol represented by general formula (6) described below.

The value for y is a number equal to or more than 1. According to a preferred method of efficiently producing a compound represented by general formula (1), which is described in detail below, compounds having different values for y are simultaneously produced. The ratio of the compounds is not particularly specified, and, for example, the compound represented by general formula (1) may be produced as only a compound represented by general formula (1) in which y represents 1 or as a composition including certain amounts of compounds represented by general formula (1) in which y represents 1 or more. However, in the compound represented by general formula (1), y represents preferably 6 or less. If y represents more than 6, the compound itself represented by general formula (1) has a high viscosity and may be difficult to blend into a paint as a viscosity modifier.

A method of producing the viscosity modifier represented by general formula (1) is not limited and may be a known method, and the viscosity modifier can be produced easily and is preferably synthesized using secondary alcohols, ethylene oxide, polyethylene glycol, and diisocyanate compounds as raw materials. The secondary alcohols to be used as raw materials can be represented by the following general formulae (4) and (5).

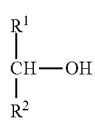

(4)

(Where $R^1$ and $R^2$ each represent a linear alkyl group having 1 to 13 carbon atoms. It should be noted that the total number of carbon atoms of $R^1$ and $R^2$ needs to be from 10 to 14.)

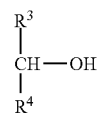

(5)

(Where $R^3$ and $R^4$ each represent a linear alkyl group having 1 to 13 carbon atoms. It should be noted that the total number of carbon atoms of $R^3$ and $R^4$ needs to be from 10 to 14.)

The raw material polyethylene glycol may be represented by the following general formula (6).

(6)

(Where x represents a number from 40 to 800.)

The raw material diisocyanate compounds may be represented by the following general formulae (7) and (8).

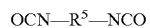

(7)

(Where $R^5$ represents general formula (2) or (3).)

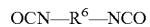

(8)

(Where $R^6$ represents the general formula (2) or (3).)

Secondary alcohol ethoxylates obtained by adding ethylene oxide to raw material alcohols represented by general formulae (4) and (5) may be identical to or different from each other, and are preferably identical to each other because as the number of kinds of raw materials becomes smaller, handling becomes easier. A commercial secondary alcohol ethoxylate may be used as the secondary alcohol ethoxylate to be used herein. Examples thereof include ADEKA TOL SO-80, ADEKA TOL SO-105, ADEKA TOL SO-120, ADEKA TOL SO-135, ADEKA TOL SO-145, and ADEKA TOL SO-160 (all of which are manufactured by ADEKA Corporation). In addition, it is possible to modify values of m and n in general formula (1) by adding ethylene oxide to a commercial polyoxyethylene secondary alkyl ether.

In addition, the raw material diisocyanate compounds represented by general formulae (7) and (8) are also preferably identical to each other for the same reason. Two kinds of the raw material diisocyanate compounds may be used, and specific examples thereof include hexamethylene diisocyanate and 4,4'-biscyclohexyl bisdiisocyanate.

When the secondary alcohol ethoxylates obtained by adding ethylene oxide to raw material alcohols represented by general formulae (4) and (5) are identical to each other and the diisocyanate compounds represented by general formulae (7) and (8) are identical to each other, the production method includes, for example, allowing 0.75 mol to 1.25 mol, preferably 0.9 mol to 1.1 mol of raw material polyethylene glycol represented by the general formula (6) to react with 2 mol of a secondary alcohol ethoxylate obtained by adding ethylene oxide to the alcohol represented by general formula (4), and further allowing 1.5 mol to 2.5 mol, preferably 1.8 mol to 2.2 mol of the raw material diisocyanate to react therewith. Specific reaction conditions are as described below. Examples of the method include: a method involving adding the raw material diisocyanate to a mixture of the raw material secondary alcohol ethoxylate and raw material polyethylene glycol and allowing the resultant to react at from 60° C. to 100° C. for from 1 hour to 10 hours; and a method involving adding the raw material diisocyanate to raw material polyethylene glycol, allowing the resultant to react at from 60° C. to 100° C. for from 1 hour to 5 hours, adding the raw material alcohol thereto, and further allowing the resultant to react at the same temperature for from 1 hour to 5 hours. A catalyst may be used, though the reaction proceeds without a catalyst. For example, the following catalyst may be used as the catalyst at from about 0.01 mass % to 1 mass % with respect to a total of the system: a metal halide such as titanium tetrachloride, hafnium chloride, zirconium chloride, aluminum chloride, gallium chloride, indium chloride, iron chloride, tin chloride, or boron fluoride; a hydroxide, alcoholated product, or carbonate of an alkali metal or alkaline earth metal, such as sodium hydroxide, potassium hydroxide, sodium methylate, or sodium carbonate; a metal oxide such as aluminum oxide, calcium oxide, barium oxide, or sodium oxide; an organic metal compound such as tetraisopropyl titanate, dibutyltin dichloride, dibutyltin oxide, or dibutyltin bis(2-ethylhexyl thioglycolate); or soap such as sodium octylate, potassium octylate, sodium laurate, or potassium laurate.

After completion of the reaction, in order to facilitate handling, the resultant is preferably diluted with water, a mixture of water and a water-soluble solvent, or the like so as to have a solid content of about from 10 mass % to 50 mass %. As the water-soluble solvent, for example, there may be used: an alcohol such as methanol, ethanol, propanol, or butanol; or a polyether-based solvent obtained by adding 1 mol to 10 mol of ethylene oxide and/or propylene oxide to an alcohol comprising a hydrocarbon group having 1 to 10 carbon atoms. If a water-soluble solvent is used, the solvent is preferably added in an amount of from about 1 mass % to about 15 mass % with respect to the total amount of the composition.

Depending on the blending ratio of the raw materials, and the reaction methods and the reaction conditions, a composition including a mixture of compounds represented by general formula (1) and having different values for y is obtained. The viscosity modifier of the present invention may be a single compound or a mixture of the compounds, and y preferably represents 6 or less because compounds having a large value for y have high viscosity and are difficult to handle. In addition, the composition may contain by-products represented by general formula (1) in which the value for y is 0 or more than 6. If the composition contains the by-products, the total amount of the compounds represented by general formula (1) in which y represents a number from 1 to 6 is preferably 50 mass % or more, more preferably 70 mass % or more, even more preferably 90 mass % or more, with respect to the total amount of the composition. If the compound represented by general formula (1) in which y represents 0 increases, the composition may have poor solubility in a paint or the like and its use may become difficult, while if there is an increase in the compounds represented by general formula (1) in which the value for y is 7 or more, the product viscosity becomes too large, which may deteriorate solubility in a paint or the like.

The emulsion resin composition of the present invention is obtained by adding the viscosity modifier of the present invention to an emulsion resin. The amount of the viscosity modifier added is not particularly limited, and is preferably from 0.1 mass % to 5 mass %, more preferably from 0.2 mass % to 3 mass %, with respect to the total amount of the emulsion resin composition. When the addition amount is less than 0.1 mass %, the effects as a viscosity modifier may not be obtained. If the addition amount exceeds 5 mass %, the effects commensurate with the addition amount may not be obtained, or the viscosity modifier may not be dissolved completely in the emulsion resin.

Any of the known emulsion resins may be used as the emulsion resin that may be used. Examples of such emulsion resin include urethane-based emulsions, acrylate-based emulsions, styrene-based emulsions, vinyl acetate-based emulsions, styrene/butadiene (SBR) emulsions, acrylonitrile/butadiene/styrene (ABS) emulsions, a butadiene (BR) emulsion, isoprene (IR) emulsions, acrylonitrile/butadiene (NBR) emulsions, and mixtures thereof.

Examples of the urethane-based emulsions include polyether polyol-based, polyester polyol-based, and polycarbonate polyol-based ones.

Examples of the acrylate-based emulsion include polymers of (meth)acrylic acid (or esters thereof) alone, (meth)acrylic acid (or esters thereof)/styrene, (meth)acrylic acid (or esters thereof)/vinyl acetate, (meth)acrylic acid (or esters thereof)/acrylonitrile, (meth)acrylic acid (or esters thereof)/butadiene, (meth)acrylic acid (or esters thereof)/vinylidene chloride, (meth)acrylic acid (or esters thereof)/allylamine, (meth)acrylic acid (or esters thereof)/vinylpyridine, (meth)acrylic acid (or esters thereof)/alkylolamide, (meth)acrylic acid (or esters thereof)/N,N-dimethylaminoethyl ester, and (meth)acrylic acid (or esters thereof)/N,N-diethylaminoethyl vinyl ether, and cyclohexyl methacrylate-based polymers, epoxy-modified polymers, and urethane-modified polymers.

Examples of the styrene-based emulsion include polymers of styrene alone, styrene/acrylonitrile, styrene/butadiene, styrene/fumaronitrile, styrene/maleonitrile, styrene/cyanoacrylic acid ester, styrene/phenylvinyl acetate, styrene/chloromethylstyrene, styrene/dichlorostyrene, styrene/vinylcarbazole, styrene/N,N-diphenylacrylamide, styrene/methylstyrene, acrylonitrile/butadiene/styrene, styrene/acrylonitrile/methylstyrene, styrene/acrylonitrile/vinylcarbazole, and styrene/maleic acid.

Examples of the vinyl acetate-based emulsion include polymers of vinyl acetate alone, vinyl acetate/styrene, vinyl acetate/vinyl chloride, vinyl acetate/acrylonitrile, vinyl acetate/maleic acid (or esters thereof), vinyl acetate/fumaric acid (or esters thereof), vinyl acetate/ethylene, vinyl acetate/propylene, vinyl acetate/isobutylene, vinyl acetate/vinylidene chloride, vinyl acetate/cyclopentadiene, vinyl acetate/crotonic acid, vinyl acetate/acrolein, and vinyl acetate/alkyl vinyl ether.

Of the emulsion resins, urethane-based emulsions, acrylate-based emulsions, and styrene-based emulsions are preferred because the emulsions have particularly satisfactory stability.

The aqueous paint composition of the present invention is obtained by adding 0.1 mass % to 5 mass %, preferably 0.2 mass % to 3 mass % of the viscosity modifier of the present invention to an aqueous paint including an emulsion resin, with respect to the total amount of the aqueous paint composition. If the addition amount is less than 0.1 mass %, an effect as a viscosity modifier may not be achieved. If the addition amount exceeds 5 mass %, effects commensurate with the addition amount may not be obtained, or the viscosity modifier may not be dissolved completely in an aqueous paint.

Any known emulsion-based aqueous paint may be used as the aqueous paint. The emulsion resins described above may be used as the emulsion resin that may be used for the aqueous paint, and the emulsion-based aqueous paint may be obtained by adding one or more kinds of the following additives to such emulsion resin: pigments, colorants, pearling agents, antiseptics, perfumes, plasticizers, antifoaming agents, fillers, antioxidants, UV absorbers, curing agents, catalysts, solvents, flame retardants, antistatic agents, heat stabilizers, pH modifiers, antifreezing agents, wetting agents, pigment dispersants, antiskinning agents, siccatives, and the like.

EXAMPLES

The present invention is hereinafter described specifically by way of Examples.

<Production of Samples>

800 g (0.1 mol) of polyoxyethylene glycol having a weight-average molecular weight of 8,000 and 40.2 g (0.2 mol) of an adduct of a mixture of secondary alcohols having 12 to 14 carbon atoms (an average carbon atom number of 13) with 3 mol of ethylene oxide (Alcohol 1) were added to a 2,000-ml volume four-necked flask with a thermometer, a nitrogen introducing pipe, and an agitator, and then mixed. Subsequently, 34 g (0.2 mol) of hexamethylene diisocyanate was added thereto, and the mixture was allowed to react at from 80° C. to 90° C. for 3 hours to obtain Product 1 of the present invention. It should be noted that, as the secondary alcohol having 12 to 14 carbon atoms and used for synthesis of Alcohols 1 to 7, only one kind of alcohol is used represented by general formula (4) in which $R^1$ and $R^2$ each represent a linear alkyl group having 1 to 12 carbon atoms and the total number of carbon atoms in $R^1$ and $R^2$ is from 11 to 13. Further, the following raw materials were used to produce viscosity modifiers as Products 2 to 9 of the present invention and Comparative Products 1 to 9 using the same apparatus by the same method. Details of the raw materials are shown in Tables 1 and 2.

<Raw Materials used in Production of Samples>

Alcohol 1: Secondary alcohols having 12 to 14 carbon atoms with 3 EO (ADEKA TOL SO-80 (manufactured by ADEKA Corporation))
Alcohol 2: Secondary alcohols having 12 to 14 carbon atoms with 7 EO (obtained by adding 4 mol of ethylene oxide to 1 mol of Alcohol 1)
Alcohol 3: Secondary alcohols having 12 to 14 carbon atoms with 12 EO (obtained by adding 9 mol of ethylene oxide to 1 mol of Alcohol 1)
Alcohol 4: Secondary alcohols having 12 to 14 carbon atoms with 15 EO (obtained by adding 12 mol of ethylene oxide to 1 mol of Alcohol 1)
Alcohol 5: Secondary alcohols having 12 to 14 carbon atoms with 20 EO (obtained by adding 17 mol of ethylene oxide to 1 mol of Alcohol 1)
Alcohol 6: Secondary alcohols having 12 to 14 carbon atoms with 30 EO (obtained by adding 27 mol of ethylene oxide to 1 mol of Alcohol 1)
Alcohol 7: Secondary alcohols having 12 to 14 carbon atoms with 50 EO (obtained by adding 47 mol of ethylene oxide to 1 mol of Alcohol 1)
Alcohol 8: Lauryl alcohol (having 12 carbon atoms) with 10 EO
Alcohol 9: 2-Hexyldecanol with 10 EO
PEG 1: Polyethylene glycol (having a molecular weight of 4,000)
PEG 2: Polyethylene glycol (having a molecular weight of 8,000)
PEG 3: Polyethylene glycol (having a molecular weight of 10,000)
PEG 4: Polyethylene glycol (having a molecular weight of 20,000)
HDI: Hexamethylene diisocyanate
H-MDI: 4,4'-Biscyclohexylmethane diisocyanate
TDI: Tolylene diisocyanate
MDI: 4,4'-Diphenylmethane diisocyanate
IPDI: Isophorone diisocyanate

TABLE 1

(Molar ratio between raw materials used in the Products of the present invention)

| | Product of the present invention | | | | | | | | |
|---|---|---|---|---|---|---|---|---|---|
| | 1 | 2 | 3 | 4 | 5 | 6 | 7 | 8 | 9 |
| Alcohol 1 | 2 | | | | | | | | |
| Alcohol 2 | | 2 | | | | | | | 1 |
| Alcohol 3 | | | 2 | | 2 | 2 | 2 | 2 | 1 |
| Alcohol 4 | | | | 2 | | | | | |
| Alcohol 5 | | | | | | | | | |
| Alcohol 6 | | | | | | | | | |
| Alcohol 7 | | | | | | | | | |
| Alcohol 8 | | | | | | | | | |
| Alcohol 9 | | | | | | | | | |
| PEG 1 | | | | | 1 | | | | |
| PEG 2 | 1 | 1 | 1 | 1 | | | 1 | | 1 |
| PEG 3 | | | | | | | | 1 | |
| PEG 4 | | | | | | 1 | | | |
| HDI | 2 | 2 | 2 | 2 | 2 | 2 | | | 2 |
| H-MDI | | | | | | | 2 | 2 | |
| TDI | | | | | | | | | |
| MDI | | | | | | | | | |
| IPDI | | | | | | | | | |

TABLE 2

(Molar ratio between raw materials used in the Comparative Products)

| | Comparative Product | | | | | | | | |
|---|---|---|---|---|---|---|---|---|---|
| | 1 | 2 | 3 | 4 | 5 | 6 | 7 | 8 | 9 |
| Alcohol 1 | | | | | | | | | |
| Alcohol 2 | | | | | | | | | |
| Alcohol 3 | 2 | 2 | 2 | | | | | | |
| Alcohol 4 | | | | | | | | | |
| Alcohol 5 | | | | 2 | | | | | |
| Alcohol 6 | | | | | 2 | | | | |
| Alcohol 7 | | | | | | 2 | | | |
| Alcohol 8 | | | | | | | 2 | | |
| Alcohol 9 | | | | | | | | 2 | 2 |
| PEG 1 | | | | | | | | | |
| PEG 2 | 1 | 1 | 1 | 1 | 1 | 1 | 1 | 1 | 1 |
| PEG 3 | | | | | | | | | |
| PEG 4 | | | | | | | | | |
| HDI | | | | 2 | 2 | 2 | 2 | 2 | |
| H-MDI | | | | | | | | | 2 |
| TDI | 2 | | | | | | | | |
| MDI | | 2 | | | | | | | |
| IPDI | | | 2 | | | | | | |

<Analysis by GPC>

Products 3 and 8 of the present invention were each measured for the molecular weight distribution of the compound of general formula (1) by gel permeation chromatography (GPC).

Further, the device and conditions used for the measurement are described below.

Columns used: TSKgel G4000HXl, G3000HXl, G2000HXl (all of which are manufactured by Tosoh Corporation) were connected in series.
Eluent: Tetrahydrofuran (THF)
Flow rate: 1 ml/min
Detector: HLC-8120GPC (RI)
Sample concentration: 0.1 mass % (THF solution)
Sample amount: 200 μl
Column temperature: 40° C.

Figure 2:
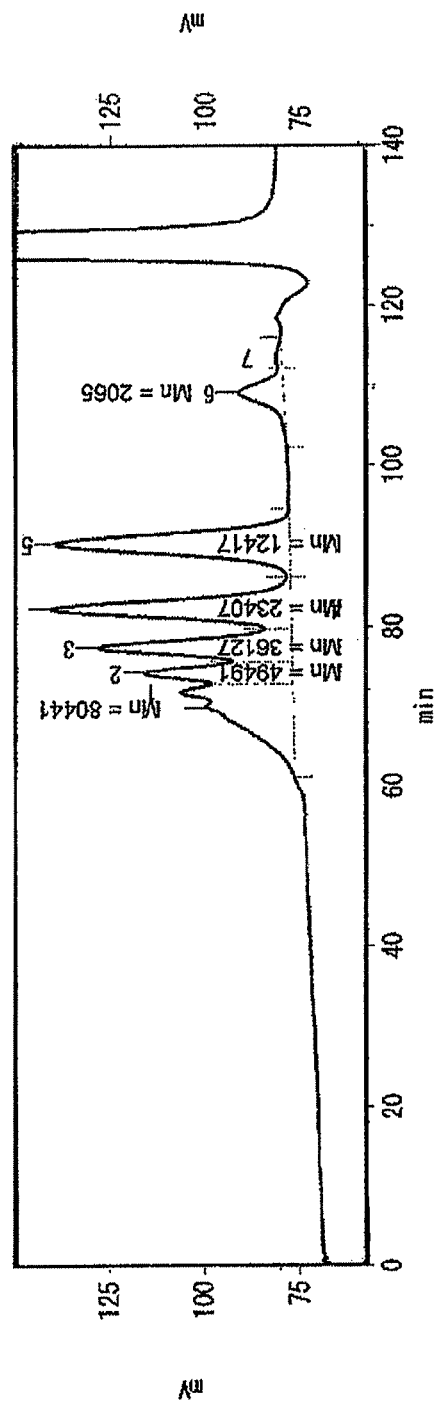
FIG. 2 is a chart of gel permeation chromatography (GPC) of Product 8 of the present invention to be described below.

The results are shown in FIGS. 1 and 2. Based on peak areas corresponding to the values for y in the general formula, blending ratios were determined. The results are shown in Table 3.

| Ratio between components (%) | | |
|---|---|---|
| | Product 3 of the present invention | Product 8 of the present invention |
| y = 0 | 1.9 | 5.15 |
| y = 1 | 15.6 | 24.2 |
| y = 2 | 18.9 | 22.2 |
| y = 3 | 16.8 | 16.2 |
| y = 4 | 13.4 | 11.0 |
| y = 5 or more | 32.8 | 20.7 |

<Long-term Storage Stability Test 1>

0.5 part of each of Products 1 to 9 of the present invention, and Comparative Products 1 to 9 were added to 100 parts by mass of a test paint to prepare paint samples, and the viscosity of the paint samples were measured immediately after the addition. Subsequently, the paint samples were divided into three aliquots and added to sealing containers, and the containers were left to stand for three months in thermostatic chambers at 2° C., 25° C., and 50° C. Three months later, the viscosity was measured and compared to the viscosity measured immediately after preparation of the sample to determine an index of long-term storage stability. The compositions of the test paint and acrylic emulsion resin are shown below. It should be noted that the viscosity was measured for a paint sample adjusted to 25° C. using a B8H-type viscosimeter (rotor number 2) at a rotation rate of 10 rpm.

Composition of Test Paint

A pigment paste having the following composition was prepared and then mixed with the following acrylic emulsion and other additives to prepare a test paint. The detailed composition thereof is as follows.

Acrylic emulsion resin: 53.25 parts (see the following description for details)
Pigment paste: 40.06 parts (see the following description for details)
Texanol: 2.60 parts (CS-12: Chisso Corporation)
Propylene glycol: 3.80 parts
Ammonia water (28% aqueous solution): 0.10 part
Antifoaming agent: 0.19 part (ADEKA NATE B-1015: manufactured by ADEKA Corporation)
(Acrylic Emulsion Resin)
Emulsion resin obtained by subjecting a 50% aqueous solution containing methyl acrylate, ethyl acrylate, 2-hydroxyethyl acrylate, styrene, acrylamide, and methacrylic acid at a mass ratio of 18.5/56.2/8.3/10/4/3 to emulsion polymerization.
(Pigment Paste)
10% Aqueous solution of sodium tripolyphosphate: 0.5 part
Dispersant: 0.5 part (ADEKA COL W-193: manufactured by ADEKA Corporation)
Titanium oxide: 28.7parts(R-930:manufactured by Ishihara Sangyo Kaisha, Ltd.)
Antifoaming agent: 0.4 part (ADEKA NATE 3-1015: manufactured by ADEKA Corporation)
Water: 9.96 parts

TABLE 4

| | | | 25° C. × Three months later | | 2° C. × Three months later | | 50° C. × Three months later | |
|---|---|---|---|---|---|---|---|---|
| | | Initial viscosity | Viscosity | Retention ratio % | Viscosity | Retention ratio % | Viscosity | Retention ratio % |
| Product of the present invention | 1 | 11,000 | 11,300 | 103 | 11,900 | 108 | 12,000 | 109 |
| | 2 | 10,800 | 11,100 | 103 | 11,200 | 104 | 11,300 | 105 |
| | 3 | 11,200 | 11,600 | 104 | 11,700 | 104 | 11,700 | 104 |
| | 4 | 11,800 | 12,100 | 103 | 12,600 | 107 | 12,700 | 108 |
| | 5 | 12,300 | 12,600 | 102 | 13,200 | 107 | 13,400 | 109 |
| | 6 | 10,800 | 11,200 | 104 | 11,200 | 104 | 11,300 | 105 |
| | 7 | 12,200 | 12,500 | 102 | 12,700 | 104 | 12,700 | 104 |
| | 8 | 11,500 | 12,000 | 104 | 12,100 | 105 | 12,100 | 105 |
| | 9 | 11,100 | 11,400 | 103 | 11,500 | 104 | 11,500 | 104 |
| Comparative Product | 1 | 10,800 | 11,200 | 104 | 12,800 | 118 | 13,800 | 128 |
| | 2 | 11,500 | 11,800 | 103 | 13,200 | 115 | 14,400 | 125 |
| | 3 | 10,600 | 11,000 | 104 | 12,300 | 116 | 13,200 | 125 |
| | 4 | 13,000 | 13,300 | 102 | 14,800 | 114 | 16,400 | 126 |
| | 5 | 14,200 | 14,600 | 103 | 16,300 | 115 | 18,300 | 129 |
| | 6 | 17,800 | 18,500 | 104 | 20,800 | 117 | 23,500 | 132 |
| | 7 | 11,800 | 12,100 | 103 | 13,700 | 116 | 15,000 | 127 |
| | 8 | 12,300 | 12,700 | 103 | 14,100 | 115 | 15,900 | 129 |
| | 9 | 12,800 | 13,200 | 103 | 14,800 | 116 | 16,100 | 126 |

*Unit of viscosity: mPa · S

*Retention ratio (%) = (Viscosity three months later/Initial viscosity) × 100

<Long-term Storage Stability Test 2>

0.5 part of each of Products 1 to 4 of the present invention and Comparative Products 1 to 3 were added to 100 parts by mass of the acrylic emulsion resin, and the samples were subjected to the same test as the long-term storage stability test 1.

TABLE 5

Results of long-term storage stability test (acrylic emulsion resin)

|  |  | Initial viscosity | 25° C. × Three months later | | 2° C. × Three months later | | 50° C. × Three months later | |
| --- | --- | --- | --- | --- | --- | --- | --- | --- |
|  |  |  | Viscosity | Retention ratio % | Viscosity | Retention ratio % | Viscosity | Retention ratio % |
| Product of the present invention | 1 | 8,900 | 9,100 | 102 | 9,500 | 107 | 9,600 | 108 |
|  | 2 | 8,500 | 8,600 | 101 | 8,700 | 102 | 8,800 | 104 |
|  | 3 | 9,100 | 9,300 | 102 | 9,400 | 103 | 9,400 | 103 |
|  | 4 | 9,500 | 9,800 | 103 | 10,200 | 107 | 10,400 | 109 |
| Comparative Product | 1 | 8,600 | 8,900 | 103 | 9,900 | 115 | 11,000 | 128 |
|  | 2 | 9,600 | 10,000 | 104 | 11,000 | 114 | 12,500 | 130 |
|  | 3 | 8,500 | 8,700 | 102 | 9,600 | 113 | 10,700 | 126 |

*Unit of viscosity: mPa · S
*Retention ratio (%) = (Viscosity three months later/Initial viscosity) × 100

As is apparent from the results of the long-term storage stability tests, it was found that the results of the paints and the results of the emulsion resins showed similar tendencies. The viscosities of the paints and the emulsions showed little change even when the paints and the emulsions were stored at normal temperature (25° C.) for a long period of time, but all of the viscosities of the comparative products increased by 10% or more if the products were stored at a low temperature or high temperature for a long period of time. On the other hand, the ratios of changes in viscosities of products of the present invention were less than 10%, and the viscosities showed little change, even if the products were stored at a low temperature or high temperature for a long period of time.

The invention claimed is:

1. A viscosity modifier represented by the following formula (1):

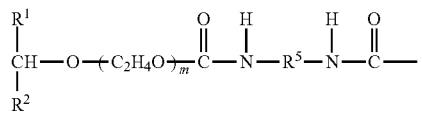

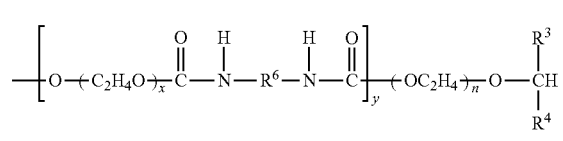

where: $R^1$ to $R^4$ each represent a linear alkyl group having 1 to 13 carbon atoms; $R^5$ and $R^6$ each represent a group represented by the following formula (2) or (3); m and n each represent a number from 3 to 15; x represents a number from 40 to 800; and y represents a number equal to or more than 1, provided that each of a total number of carbon atoms in $R^1$ and $R^2$ and a total number of carbon atoms in $R^3$ and $R^4$ is from 11 to 13:

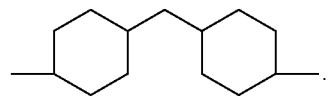

2. The viscosity modifier according to claim 1, wherein $R^5$ and $R^6$ in formula (1) represent the same group.

3. A viscosity modifier, which is produced by a preparation method comprising the steps of:
obtaining secondary alcohol ethoxylates by adding ethylene oxide to alcohols represented by the following formulae (4) and (5); and then
reacting said alcohol ethoxylates and a compound represented by the following formula (6) with diisocyanates represented by the following formulae (7) and (8):

where: $R^1$ to $R^4$ each represent a linear alkyl group having 1 to 13 carbon atoms; $R^5$ and $R^6$ each represent a group represented by the following formula (2) or (3); and x represents a number from 40 to 800, provided that each of a total number of carbon atoms in $R^1$ and $R^2$ and a total number of carbon atoms in $R^3$ and $R^4$ is from 11 to 13:

—(CH$_2$)$_6$— (2)

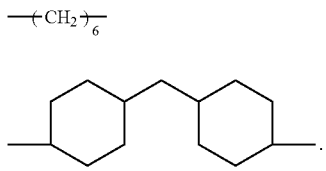 (3)

4. The viscosity modifier according to claim 3, wherein the secondary alcohol ethoxylate obtained by adding ethylene oxide to the alcohol represented by formula (4) is identical to the secondary alcohol ethoxylate obtained by adding ethylene oxide to the alcohol represented by formula (5).

5. The viscosity modifier according to claim 3, wherein the isocyanate represented by formula (7) is identical to the isocyanate represented by formula (8).

6. An emulsion resin composition, comprising 0.1 mass % to 5 mass % of the viscosity modifier of claim 1.

7. An aqueous paint composition, comprising 0.1 mass % to 5 mass % of the viscosity modifier of claim 1.

8. The viscosity modifier according to claim 4, wherein the isocyanate represented by formula (7) is identical to the isocyanate represented by formula (8).

9. An emulsion resin composition, comprising 0.1 mass % to 5 mass % of the viscosity modifier of claim 2.

10. An emulsion resin composition, comprising 0.1 mass % to 5 mass % of the viscosity modifier of claim 3.

11. An emulsion resin composition, comprising 0.1 mass % to 5 mass % of the viscosity modifier of claim 4.

12. An emulsion resin composition, comprising 0.1 mass % to 5 mass % of the viscosity modifier of claim 5.

13. An aqueous paint composition, comprising 0.1 mass % to 5 mass % of the viscosity modifier of claim 2.

14. An aqueous paint composition, comprising 0.1 mass % to 5 mass % of the viscosity modifier of claim 3.

15. An aqueous paint composition, comprising 0.1 mass % to 5 mass % of the viscosity modifier of claim 4.

16. An aqueous paint composition, comprising 0.1 mass % to 5 mass % of the viscosity modifier of claim 5.

17. A method of improving long-term storage stability at low or high temperatures of an emulsion resin, comprising adding to the emulsion resin a viscosity modifier according to claim 1.

18. A method of improving long-term storage stability at low or high temperatures of an aqueous paint, comprising adding to the aqueous paint a viscosity modifier according to claim 1.

* * * * *